United States Patent Office 3,038,916
Patented June 12, 1962

3,038,916
THERMAL STABILIZATION OF ALKYLLEAD COMPOUNDS
Shirl E. Cook and Hymin Shapiro, Baton Rouge, La., assignors to Ethyl Corporation, New York, N.Y., a corporation of Delaware
No Drawing. Filed Apr. 5, 1960, Ser. No. 20,010
8 Claims. (Cl. 260—437)

This invention relates to the thermal stabilization of alkyllead compounds. More particularly, it relates to alkyllead compositions which are stable at temperatures as high as 180–195° C.

In U.S. 2,660,591–2,660,596, inclusive, there are described a series of inventions relating to the thermal stabilization of alkyllead compounds during various manufacturing and related operations. These prior inventions primarily related to the stabilization of tetraethyllead during the separation step in its manufacture wherein the tetraethyllead is distilled (100° C.) from the reaction products accompanying its synthesis. This objective was accomplished by using a small amount of a chemical compound described in those patents as a thermal stabilizer. So successful were these inventions that the problems connected with thermal instability of tetraethyllead in its manufacture and related operations have largely vanished. In fact, naphthalene has had a relatively long and very successful commercial career as a tetraethyllead thermal stabilizer for the above distillation operation.

More recently a new set of conditions and problems have arisen in connection with the thermal stabilization of alkyllead compounds. These have resulted from the pioneering discovery that pure—i.e. halogen scavenger-free—alkyllead compounds provide distinct and very important improvements in engine operation when dissolved in certain types of base fuels. This discovery is revolutionary. If put into commercial practice it would give rise for the first time to the sale in large-sized quantities of tetraalkyllead compounds undiluted by their conventional halide scavenger complement.

Prior commercial practice has been to provide alkyllead antiknock compounds blended with an organic halide scavenger complement. About 35 percent by weight of the commercial antiknock fluid compositions has been composed of either ethylene dibromide or a mixture of ethylene dibromide and ethylene dichloride as the scavenger. Although designed primarily to overcome certain engine problems, these scavengers have conferred upon the resultant antiknock fluid composition a very substantion degree of thermal stability. Consequently the elimination of such substantial amounts of scavenger components from the antiknock mixture results in the elimination of the thermal stability protection heretofore afforded by the scavenger. In fact, the resultant pure alkyllead compound is a liquid monopropellant—that is, it can undergo a spontaneous and highly exothermic decomposition, liberating a large volume of hot gas. Hence when a critical mass of alkyllead compound under partial confinement is brought up to a sufficient temperature, it will then heat itself up and explode.

The problem of effectively inhibiting the above-described thermal decomposition is critical to the commercialization of the new antiknock additive because in commercial use the additive would be shipped and stored in much the same way as present scavenger-containing alkyllead antiknock fluids. Unless the new antiknock additive were properly stabilized against thermal decomposition and unless it had essentially the same thermal stability as the presently-sold antiknock fluids, the consequences could be disastrous. Therefore, it has been concluded that the new scavenger-free alkyllead compositions must have pronounced stability at temperatures as high as 180–195° C. at which temperatures the decomposition rate of pure alkyllead compounds is normally extremely high.

Although, as shown by U.S. 2,660,595, naphthalene is a very effective thermal stabilizer of lead alkyls at 130° C., even this commercially successful thermal stabilizer has little or no effectiveness at 180° C. and is worthless at 195° C. Consequently there is a paramount need extant for an effective means of effectively stabilizing undiluted alkyllead compounds against thermal decomposition at temperatures in the range of 180–195° C.

An object of this invention is to fulfill the foregoing need. Another object is to provide alkyllead compositions which have substantial stability even at temperatures as high as 180–195° C. Other important objects of this invention will be apparent from the ensuing description.

The above and other objects of this invention are accomplished by providing an alkyllead compound normally susceptible to rapid thermal decomposition at temperatures in the range of 180–195° C. having admixed therewith a plurality of different fused ring aromatic hydrocarbons in amount sufficient to inhibit such decomposition, said hydrocarbons having boiling points at atmospheric pressure (or extrapolated thereto) of at least about 180° C. and containing up to about 20 carbon atoms in the molecule.

A preferred embodiment of this invention involves use in the above composition of a plurality of different fused ring aromatic hydrocarbons having boiling points at atmospheric pressure of at least about 180° C. and containing up to about 20 carbon atoms in the molecule, at least two of these hydrocarbons differing from each other in molecular structure—i.e. carbon content—by at least one carbon atom. Thus, especially great thermal stability is achieved by employing such mixtures as methyl naphthalene and dimethyl naphthalene; 1,2,3,4-tetrahydronaphthalene and anthracene; ethyl naphthalene, 1,4-dihydronaphthalene and fluorene; etc.

Mixtures of different fused ring aromatic hydrocarbons as above defined which contain alkylated naphthalenes, especially mixtures of methyl and dimethyl naphthalenes, are especially preferred because of their outstanding effectiveness, high availability and relatively low costs.

Among the features of this invention is the fact that the above mixtures of different fused ring aromatic hydrocarbons confer upon the resultant scavenger-free alkyllead antiknock fluid excellent stability characteristics even at 180–195° C. where under normal circumstances explosive thermal decomposition would occur quite rapidly. Furthermore, the compositions of this invention have essentially the same thermal stability as the presently sold scavenger-containing antiknock fluids; in many cases the compositions of this invention being substantially more thermally stable. In addition the foregoing thermal stability benefits are achieved at low cost, in fact at lower cost than the thermal stability achieved in the present day antiknock fluid compositions. Still another feature of this invention is the ready availability of the present thermal stabilizers as articles of commerce.

It is desirable to use in this invention a mixture of different fused ring aromatic hydrocarbons which is liquid at ambient temperatures. This greatly facilitates blending operations and also decreases the likelihood of phase separation of the resultant alkyllead antiknock composition at low temperatures such as encountered in winter storage. In those instances where the fused ring aromatic hydrocarbon mixtures used pursuant to this invention are normally solid or are liquids with relatively high freezing points, it is helpful to admix the same with other hydrocarbons such as aliphatic, cycloaliphatic or lower boiling aromatic hydrocarbons. The effectiveness of the thermal stabilizers of this invention is so great that their potency is not impaired even when diluted in this manner.

Another aspect of this invention is the discovery that isopropanol or equivalent saturated lower aliphatic monohydric alcohol (e.g. methanol, ethanol, n-butanol, isobutanol, oxoamyl alcohols, etc.) have the ability to still further increase the effectiveness of the thermal stabilizers of this invention in protecting alkyllead compounds against thermal decomposition at the above highly elevated temperatures. Strangely enough, these alcohols when used by themselves have essentially no effectiveness whatsoever.

The chief thermal decomposition products of alkyllead compounds are lead metal and hydrocarbon gas. Hence, a very good index of alkyllead thermal decomposition is liberation of this gas.

To illustrate the effectiveness of this invention, direct comparisons were made between the decomposition characteristics of unstabilized and stabilized tetraethyllead. A thermostatically controlled hot oil bath was fitted with a stirrer, thermometer, and a holder for a small reaction tube. A 100 cc. gas buret beside the bath, and equipped with a water-containing levelling bottle, was connected by means of rubber tubing with the reaction tube after the desired sample was introduced into this tube. After the bath was brought to a steady temperature of either 180 or 195° C., the sample-containing tube was quickly immersed in the bath and clamped with the levelling bottle adjusted to hold the gas buret in place at a zero reading. Then measured was the time during which the sample was held at these high temperatures without pronounced thermal decomposition and consequent gas evolution occurring. Another criterion of thermal stability was the length of time required for 100 milliliters of such gas to be evolved under the foregoing test conditions. Thus in either instance, the longer the time, the more thermally stable was the alkyllead composition.

With pure tetraethyllead used in 1 milliliter amounts, pronounced thermal decomposition occurred practically instantaneously at 180 and 195° C. as evidenced by rapid gas evolution.

When naphthalene was blended with pure tetraethyllead to a concentration of 0.5 percent by weight and the resultant mixture subjected to the above test pronounced thermal decomposition occurred at 180° C. in 4 minutes. Thus, at this temperature and concentration the commercially successful thermal stabilizer for tetraethyllead—viz. naphthalene—was of no value whatsoever. Under the same conditions even 5 percent by weight of naphthalene was only about a tenth as effective as the presently-used halogen scavengers in protecting the tetraethyllead against thermal decomposition.

Similar tests at 195° C. have shown that at this temperature naphthalene and related compounds are of no practical value whatsoever as thermal stabilizers for alkyllead compounds.

The following examples wherein all percentages are by weight (unless otherwise specified) illustrate the compositions of this invention and the highly important technical advantages flowing therefrom.

EXAMPLE I

With pure tetraethyllead—i.e. halogen scavenger-free—was blended 5 percent of a mixture of fused ring aromatic hydrocarbons as defined above. In particular, this hydrocarbon mixture is available as an article of commerce, the manufacturer specifying that it refluxes at 255°±5° C. at 50 millimeters of mercury pressure. Not more than 0.5 percent by volume of this mixture of hydrocarbons boiled below 170° C. at 50 mm. pressure. It had a maximum viscosity of 500 Saybolt Universal seconds (SSU) at 75° F. and of 100 SSU at 212° F. and contained fused ring aromatic hydrocarbons including naphthalene, alkylnaphthalenes and 1,2,3,4-tetrahydronaphthalene. The resultant tetraethyllead composition when subjected to the above-described test at 180° C. was found to have been completely stable for over 480 minutes. In fact, the test was terminated at this time without any evidence of impending pronounced thermal deterioration. Consequently this composition had thermal stability comparable to the presently-sold scavenger-containing antiknock fluid compositions.

EXAMPLE II

With pure tetraethyllead was admixed 2.5 percent of a commercially available mixture of fused ring aromatic hydrocarbons. This mixture was shown by infrared and ultra-violet analyses to contain a significant quantity of dimethyl naphthalene isomers as well as some highly polynuclear aromatic compounds. This mixture has the following distillation temperature profile.

| Distillation: | ° C. |
|---|---|
| Initial | 254 |
| 10% | 267 |
| 50% | 282 |
| 90% | 307 |
| Final | 323 |

When tested as above at 180° C. the resultant composition was found to be completely stable for over 315 minutes. At that point the test was discontinued without any evidence of impending pronounced thermal decomposition.

EXAMPLE III

With pure tetraethyllead was blended 20 percent of a commercially aviable mixture of different fused ring aromatic hydrocarbons characterized by containing mono- and di-alkyl naphthalenes, including ethyl naphthalenes and dimethyl naphthalenes, with the methyl-substituted naphthalenes predominating .

EXAMPLE IV

Admixed with pure tetraethyllead was 20 percent of a commercially available mixture of fused ring aromatic hydrocarbons having the following distillation temperature profile.

| Distillation: | ° C. |
|---|---|
| Initial | 232 |
| 10% | 241 |
| 50% | 247 |
| 90% | 260 |
| Final | 279 |

Instrumental chemical analysis showed this hydrocarbon mixture to contain, interalia, significant quantities of 2-methyl naphthalene and various dimethyl naphthalenes principally 1,3-dimethyl naphthalene, 1,4-dimethyl naphthalene and 1,6-dimethyl naphthalene.

EXAMPLE V

Blended with pure tetraethyllead was 20 percent of a commercially available hydrocarbon mixture characterized by containing different fused ring aromatic hydrocarbons including 1,2,3,4-tetrahydronaphthalene, naphthalene and alkyl-substituted naphthalenes.

EXAMPLE VI

Conjointly admixed with pure tetraethyllead were 5 percent of anthracene (B.P. 340–2° C.) and 5 percent of 1-methyl naphthalene, B.P. 245° C.).

The compositions of Examples III–VI inclusive were subjected to the above-described test at a temperature of 195° C. For comparative purposes a sample of the predominant present-day tetraethyllead antiknock fluid composition composed principally of tetraethyllead, ethylene dibromide and ethylene dichloride was also subjected to this test. The results are presented in Table 1.

Table 1.—Compositions of This Invention Have Greater Thermal Stability at 195° C. Than the Principal Commercial Antiknock Fluid in Commercial Use Today

| Run | Thermal Stabilizer | Conc. of Thermal Stabilizer, Wt. Percent | Thermal Stability; Time to Reach Pronounced Decomp., Min. |
|---|---|---|---|
| 1 | Fused Ring Aromatic Hydrocarbon mixture of Ex. III | 20 | a>405 |
| 2 | Fused Ring Aromatic Hydrocarbon mixture of Ex. IV | 20 | 450 |
| 3 | Fused Ring Aromatic Hydrocarbon mixture of Ex. V | 20 | a>240 |
| 4 | Fused Ring Aromatic Hydrocarbon mixture of Ex. VI | 10 | a>810 |
| 5 | Ethylene dibromide + Ethylene dichloride | 36 | 121 | a Tests terminated at the time indicated without pronounced thermal deterioration having occurred.

It will be noted from the above results that all of the compositions of this invention were substantially more stable at 195° C. than the present-day principal commercial antiknock fluid. It will also be noted that the concentrations of the thermal stabilizers of this invention were in each case substantially lower than the halogen scavenger concentration used in the present commercial antiknock fluid.

EXAMPLE VII

Conjointly mixed with pure tetraethyllead were 1 percent of anthracene (B.P. 340–2° C.), 2 percent of 1,2,3,4-tetrahydronaphthalene (B.P. 206–7° C.) and 2 percent of 1-methyl naphthalene (B.P. 245° C.).

This mixture was subjected to the above-described test at 195° C. For comparative purposes the individual aromatic hydrocarbons were also tested as thermal stabilizers under the same test conditions. The results are given in Table 2.

Table 2.—Compositions of This Invention Have Greater Thermal Stability at 195° C. Than Corresponding Compositions Containing Only Individual Aromatic Hydrocarbons

| Run | Thermal Stabilizer | Thermal Stability; Time Required for Evolution of 100 ml. of Gas, Min. |
|---|---|---|
| 1 | 1% Anthracene + 2% 1,2,3,4-tetrahydronaphthalene + 2% 1-methyl naphthalene. | 53 |
| 2 | 5% 1,2,3,4-Tetrahydronaphthalene | 12 |
| 3 | 5% 1-Methyl naphthalene | 9 |
| 4 | 1% Anthracene | 21 |

EXAMPLE VIII

Conjointly blended with pure tetraethyllead were 5 percent of 1,2,3,4-tetrahydronaphthalene and 5 percent of 1-methyl naphthalene.

This mixture was subjected to the above-described test at 195° C. For comparative purposes the individual aromatic hydrocarbons were also tested as thermal stabilizers under the same test conditions. The results are given in Table 3.

Table 3.—Compositions of This Invention Have Greater Thermal Stability at 195° C. Than Corresponding Compositions Containing Only Individual Aromatic Hydrocarbons

| Run | Thermal Stabilizer | Thermal Stability; Time Required for Evolution of 100 ml. of Gas, Min. |
|---|---|---|
| 1 | 5% 1,2,3,4-Tetrahydronaphthalene + 5% 1-methyl naphthalene. | 76 |
| 2 | 10% 1-methyl naphthalene | 36 |
| 3 | 5% 1,2,3,4-Tetrahydronaphthalene | 12 |

EXAMPLE IX

With pure tetraethyllead were conjointly blended 1 percent of anthracene and 5 percent of 1,2,3,4-tetrahydronaphthalene.

This mixture was subjected to the above described test at 195° C. For comparative purposes the individual aromatic hydrocarbons were also tested as thermal stabilizers under the same test conditions. The results are given in Table 4.

Table 4.—Compositions of This Invention Have Greater Thermal Stability at 195° C. Than Corresponding Compositions Containing Only Individual Aromatic Hydrocarbons

| Run | Thermal Stabilizer | Thermal Stability; Time Required for Evolution of 100 ml. of Gas, Min. |
|---|---|---|
| 1 | 1% Anthracene + 5% 1,2,3,4-Tetrahydronaphthalene. | 165 |
| 2 | 1% Anthracene | 21 |
| 3 | 5% 1,2,3,4-Tetrahydronaphthalene | 12 |

Examples X and XI illustrate that facet of this invention involving the use of a lower saturated aliphatic monoalcohol in combination with the fused ring aromatic hydrocarbon mixtures and the outstanding results achieved from these compositions.

EXAMPLE X

Admixed with pure tetraethyllead were 10 percent of the commercially available mixture of different fused ring aromatic hydrocarbons described in Example II and 15 percent of isopropanol. At 195° C. this mixture did not undergo pronounced thermal deterioration for over 100 minutes. Ten percent of the aromatic mixture alone protected the tetraethyllead for 25 minutes, whereas 15 percent of isopropanol alone was completely ineffective (i.e. after 3 minutes pronounced thermal deterioration set in).

EXAMPLE XI

The procedure of Example X was repeated except that 15 percent of the fused ring aromatic hydrocarbon mixture and 10 percent of isopropanol were used conjointly as the thermal stabilizer. In this case the resultant composition of this invention was stable for 230 minutes. This concentration of the aromatic mixture alone stabilized the tetraethyllead for 116 minutes. As shown in Example X, isopropanol alone was ineffective.

EXAMPLE XII

With pure tetraethyllead was blended a synthetic mixture of aromatic hydrocarbons containing an appreciable amount of 2-methyl naphthalene, as well as various dimethyl naphthalene isomers. The concentration was 20 percent. This composition was subjected to the above-described test at 195° C. and compared with the principal commercial antiknock fluid in commercial use today. The results are given in Table 5.

*Table 5.—Compositions of This Invention Have Greater Thermal Stability at 195° C. Than the Principal Commercial Antiknock Fluid in Commercial Use Today*

| Run | Thermal Stabilizer | Conc. of Thermal Stabilizers, Wt. Percent | Thermal Stability; Time Required for Evolution of 100 ml. of Gas, Min. |
| --- | --- | --- | --- |
| 1 | Fused ring aromatic hydrocarbon mixture of Ex. XII. | 20 | 200 |
| 2 | Ethylene dibromide + Ethylene dichloride. | 36 | 122 |

EXAMPLE XIII

Three individual tetramethyllead-containing compositions of this invention are prepared as follows: With one portion of tetramethyllead are mixed 1 percent of 9-ethyl-9,10-dihydro anthracene (B.P. 320° C.) and 1 percent of 2-ethyl naphthalene (B.P. 251° C.). With another portion of the tetramethyllead are blended 2 percent of naphthalene, 1 percent of indene, 3 percent of acenaphthene and 4 percent of benzene. With the third portion of the tetramethyllead are blended 0.5 percent of 9,10-dimethyl phenanthrene and 2.5 percent of 1-methyl anthracene as a xylene solution. Each of these resultant compositions has extreme stability against spark and shock initiated thermal decomposition at 195° C.

EXAMPLE XIV

Conjointly mixed with a portion of pure trimethylethyllead are 5 percent of 1-ethyl naphthalene, 0.5 percent of phenanthrene, 0.5 percent of chrysene and 3 percent of 1,4-dimethyl naphthalene. With another portion of the trimethylethyllead are blended a benzene solution of 9-phenyl anthracene (such that the concentration of the latter is 1 percent based on the lead compound), 0.25 percent of 1-benzyl naphthalene, 0.5 percent of fluorene and 0.05 percent of pyrene. Each of the resultant trimethylethyllead compositions possesses excellent stability at 195° C.

EXAMPLE XV

Blended with individual portions of diethyldimethyllead, of triethylmethyllead, of tetraethyllead, of an equimolar mixture of the foregoing 3 lead compounds, of tetraisopropyllead and of tetraoctyllead is a mixture composed of white gasoline hydrocarbons (i.e. unleaded gasoline) with which has been blended alpha-hexahydroanthracene, 1-phenyl naphthalene, naphthacene, 1,5-diisopropyl naphthalene and indene in amounts such that the resultant alkyllead compositions contain 0.5 percent by weight of each of the foregoing five fused ring aromatic hydrocarbons. Consequently each of these alkyllead compositions contains, in addition to the gasoline, a total of 2.5 percent by weight of a thermal stabilizer mixture of this invention. All of these alkyllead compositions possess excellent thermal stability at 195° C.

EXAMPLE XVI

With an equimolar mixture of pure tetramethyllead and pure tetraethyllead is blended 30 percent of the mixture of fused ring aromatic hydrocarbons described in Example II. The resultant alkyllead composition possesses extreme stability against thermal decomposition at 195° C.

EXAMPLE XVII

With pure tetraethyllead are conjointly admixed 9.5 percent of a mixture of dimethyl naphthalenes and 0.5 percent of 2-benzyl naphthalene. The resultant composition possesses excellent stability at 195° C.

EXAMPLE XVIII

With each of the alkyllead compositions described in Examples XIII–XVII, inclusive, are blended either 5–20 percent (based on the alkyllead compound) of methanol or 5–25 percent by weight (based on the alkyllead compound) of isopropanol. In all instances the thermal stabiliyt of the resultant multi component blends is made even more outstanding by the copresence of these lower aliphatic saturated monohydric alcohols.

The thermal stabilizers of this invention have such exceptional effectiveness that even at trace quantities they produce a detectable improvement in thermal stability of scavenger-free alkyllead compounds even at 195° C. However, it is generaly preferable to employ from about 2 to about 30 percent by weight of these mixtures. In order to achieve the fullest benefits of this invention, it is especially preferable to use from about 15 to about 30 percent by weight of these mixtures when they predominate in binuclear fused ring aromatics and contain less than 5 percent of tri- and/or higher polynuclear compounds. When using mixtures which predominate in tri- and/or tetranuclear fused ring aromatics it is especially preferable to use from about 2 to about 10 percent thereof and to admix these hydrocarbons with low boiling aromatics such as benzene, toluenes, xylenes, and the like. The ratios or relative proportions of the various fused ring aromatic hydrocarbon components of the thermal stabilizer mixtures of this invention are not critical. These ratios are dependent upon the source of the particular mixture used and on the number of individual fused ring aromatic hydrocarbons present in the mixture. However, generally speaking, it is desirable that the mixture contain at least two different fused ring aromatic hydrocarbons, at least one of these two compounds being present to the extent of at least 5 percent by weight of the other.

This invention is useful in stabilizing alkyllead compounds in which at least one valence of the lead is satisfied by an alkyl radical. For example tetraethyllead, tetramethyllead, tetrapropyllead, dimethyldiethyllead, triethylphenyllead, and triethyllead bromide can be successfully stabilized against thermal decomposition at 180–195° C. by incorporating therewith a thermal stabilizer mixer of this invention.

When saturated lower aliphatic monohydric alcohols are used in the compositions fo this invention recourse can be had, singly or in combination, to methanol, ethanol, isopropanol, n-propanol, the several butanols, the various pentanols, and the various hexanols. In short, these alcohols preferably contain from 1 to about 6 carbon atoms in the molecule. Of these compounds isopropanol gives the most outstanding results in boltering the effectiveness of the resultant composition even beyond its already substantial potency. Accordingly, the use of isopropanol for this purpose is especially preferred. Generally speaking, the alcohol should be present in amount such that the alkyllead composition contains from about 1 to about 25 percent of the alcohol based on the alkyllead content. It is desirable that the total thermal stabilizer content of these aromatic hydrocarbon mixture-monohydric aliphatic alcohol multi-component systems range from about 3 to about 45 percent based on the weight of the alkyllead compound.

What is claimed is:
1. A halogen scavenger-free alkyllead compound normally susceptible to rapid decomposition at temperatures in the range of 180–195° C. having admixed therewith (1) a mixture of fused ring aromatic hydrocarbons, said mixture being characterized in that it contains at least 2 different fused ring aromatic hydrocarbons at least one of which is present to the extent of at least 5 percent by weight of the other, in that said hydrocarbons have boiling points at atmospheric pressure of at least about

180° C., in that said hydrocarbons contain up to about 20 carbon atoms in the molecule, and in that at least 2 of said hydrocarbons differ from each other in carbon content by at least one carbon atom; and (2) a saturated lower aliphatic monohydric alcohol having the formula ROH wherein R is a lower alkyl group; there being present from about 2 to about 30 percent of said hydrocarbons and from about 1 to about 25 percent of said alcohol such that the total amount of said hydrocarbons plus said alcohol is in the range of about 3 to about 45 percent and sufficient to inhibit such decomposition, all percentages being by weight and being based on the weight of said compound.

2. The composition of claim 1 wherein said alcohol is isopropanol.

3. A halogen scavenger-free alkyllead compound normally susceptible to rapid decomposition at temperatures in the range of 180-195° C. having admixed therewith a mixture of fused ring aromatic hydrocarbons in amount sufficient to inhibit such decomposition; said mixture being characterized in that it contains at least 2 different fused ring aromatic hydrocarbons at least one of which is present to the extent of at least 5 percent by weight of the other, in that said hydrocarbons have boiling points at atmospheric pressure of at least about 180° C., in that said hydrocarbons contain up to about 20 carbon atoms in the molecule, in that at least 2 of said hydrocarbons differ from each other in carbon content by at least one carbon atom, in that it is selected from the group consisting of (1) mixtures containing at least 2 different alkylated naphthalenes and (2) mixtures containing only one alkylated naphthalene and at least one fused ring aromatic hydrocarbon containing 3 fused rings, and in that it is characterized by retarding the inception of pronounced thermal decomposition when employed in pure tetraethyllead held at 195° C. for a time of at least 200 minutes.

4. The composition of claim 3 wherein said mixture includes at least 2 different alkylated naphthalenes.

5. The composition of claim 3 wherein said mixture includes at least 2 different methyl naphthalenes.

6. The composition of claim 3 wherein said mixture includes methyl and dimethyl naphthalenes.

7. The composition of claim 1 wherein said alcohol is isopropanol and said mixture includes alkylated naphthalenes.

8. The composition of claim 1 wherein said alcohol is isopropanol and said mixture includes methyl and dimethyl naphthalenes.

References Cited in the file of this patent

UNITED STATES PATENTS

| | | |
|---|---|---|
| 2,660,592 | Calingaert | Nov. 24, 1953 |
| 2,660,596 | Calingaert | Nov. 24, 1953 |
| 2,688,628 | Shapiro et al. | Sept. 7, 1954 |

FOREIGN PATENTS

| | | |
|---|---|---|
| 670,526 | Great Britain | Apr. 23, 1952 |